US010624724B2

(12) United States Patent
Robinson

(10) Patent No.: US 10,624,724 B2
(45) Date of Patent: Apr. 21, 2020

(54) BRISTLED DENTAL FLOSS

(71) Applicant: Sterling V. Robinson, Bronx, NY (US)

(72) Inventor: Sterling V. Robinson, Bronx, NY (US)

( * ) Notice: Subject to any disclaimer, the term of this patent is extended or adjusted under 35 U.S.C. 154(b) by 18 days.

(21) Appl. No.: 15/064,734

(22) Filed: Mar. 9, 2016

(65) Prior Publication Data
US 2017/0071709 A1 Mar. 16, 2017

Related U.S. Application Data

(60) Provisional application No. 62/216,707, filed on Sep. 10, 2015.

(51) Int. Cl.
*A45C 15/04* (2006.01)
*A61C 15/04* (2006.01)

(52) U.S. Cl.
CPC .......... *A61C 15/042* (2013.01); *A61C 15/043* (2013.01)

(58) Field of Classification Search
CPC ... A61C 15/042; A61C 15/043; A61C 15/046; A61C 15/041
See application file for complete search history.

(56) References Cited

U.S. PATENT DOCUMENTS

| 3,939,520 A * | 2/1976 | Axelsson | A46B 7/10 132/308 |
| 4,922,936 A * | 5/1990 | Buzzi | A61C 15/02 132/321 |
| 5,063,948 A * | 11/1991 | Lloyd | A61C 15/042 132/321 |
| 5,682,911 A * | 11/1997 | Harada | A46B 3/18 132/321 |
| 6,250,313 B1 * | 6/2001 | Rees | A61C 15/042 132/321 |
| 8,025,068 B2 | 9/2011 | Culver | |
| 2005/0061354 A1 | 3/2005 | Dill, III | |
| 2013/0000668 A1 * | 1/2013 | Madsen | A46B 3/18 132/323 |
| 2014/0366903 A1 * | 12/2014 | Chun | A61C 15/046 132/200 |
| 2016/0095678 A1 * | 4/2016 | Robertson | A61C 15/042 132/329 |
| 2016/0346067 A1 * | 12/2016 | Pines | A61C 15/046 |

* cited by examiner

*Primary Examiner* — Yogesh P Patel
*Assistant Examiner* — Jennifer F Gill
(74) *Attorney, Agent, or Firm* — MU P.C.

(57) ABSTRACT

A bristled dental floss is provided for effectively removing plaque, tartar, food particles and the like from between a user's teeth. The bristled dental floss includes an elongated, flexible floss core. A plurality of floss bristles extends from the floss core. At least one elongated bristle group is formed by the plurality of floss bristles. An undulating pattern is formed by the plurality of floss bristles in each bristle group. In typical use, the bristled dental floss may be inserted between the teeth of a user and moved in a back-and-forth motion. The bristle groups effectively remove plaque, tartar, food particles and the like from between the user's teeth, particularly in hard-to-reach recessed areas between the teeth.

20 Claims, 7 Drawing Sheets

BRISTLED DENTAL FLOSS

CROSS-REFERENCE TO RELATED APPLICATION

This application claims the benefit of U.S. Provisional Patent Application Ser. No. 62/216,707, filed Sep. 10, 2015, which is incorporated herein in its entirety.

FIELD OF THE INVENTION

The present invention relates generally to dental devices, and more particularly, to a bristled dental floss having multiple floss bristles arranged in one or more bristle groups which effectively remove food particles from between a user's teeth.

BACKGROUND OF THE INVENTION

Dental disease, such as periodontal (gum) disease and tooth cavities, is caused mainly by plaque, tartar, food particles and the like accumulating in the user's mouth over time and not being properly treated. In order to prevent or delay dental disease, it is recommended to combine regular tooth brushing with dental flossing. A dental floss is a cord or strip which is passed in between adjacent teeth to clean intermediate gaps which a toothbrush cannot reach. Alternatively or additionally to dental floss, interproximal brushes are commonly used for brushing in between teeth. Furthermore, use of a mouthwash or mouthrinse at least once a day may be recommended to reduce bacteria build-up in the mouth. Finally, in addition to these personal hygiene actions, dentists recommend professional dental cleaning at least once a year, to eliminate any plaque or tartar that may have accumulated despite frequent brushing, flossing, mouth washing or mouth rinsing.

Despite their widespread use and acceptance, conventional dental floss and interproximal brushes are often unable to reach small particles in hard-to-reach areas between teeth. Consequently, cavities and other forms of tooth decay, as well as bad breath, may result if the teeth are not properly cleaned and maintained each day.

Accordingly, there is an established need for an improved dental floss which is able to effectively remove food particles from between a user's teeth.

SUMMARY OF THE INVENTION

The present invention is directed to bristled dental floss having multiple floss bristles arranged in one or more bristle groups which effectively remove plaque, tartar, food particles and the like from between a user's teeth. The bristled dental floss includes an elongated, flexible floss core. Multiple floss bristles extend from the floss core. The floss bristles may be arranged in at least one bristle group which extends along the length of and parallel to the longitudinal axis of the floss core. In some embodiments, multiple bristle groups may extend along the length of the floss core in adjacent, parallel, spaced-apart relationship to each other. Each bristle group may include floss bristles of various lengths such that a wave-like or undulating pattern is shaped in each bristle group along the length of each. In typical use, the bristled dental floss may be inserted between the teeth of a user and moved in a back-and-forth motion. The bristle groups effectively remove plaque, tartar, food particles and the like from between the user's teeth, particularly in hard-to-reach areas between the teeth.

In a first implementation of the invention, a bristled dental floss for removing plaque, tartar, food particles and the like from between a user's teeth includes an elongated, flexible floss core extending along a longitudinal direction, and a plurality of floss bristles extending from the floss core. The plurality of floss bristles are grouped into at least one elongated bristle group. The bristles are cut or otherwise formed such that an undulating pattern is provided in the longitudinal direction by an outer side of the plurality of floss bristles in the at least one elongated bristle group.

In a second aspect, the undulating pattern can include a plurality of undulating pattern ridges, an undulating pattern trough between each pair of adjacent undulating pattern ridges, and a pair of undulating pattern sloped sections extending between each undulating pattern ridge of the plurality of undulating pattern ridges and an adjacent pair of undulating pattern troughs of the plurality of undulating pattern troughs. The undulating pattern ridges and/or troughs can be optionally V-shaped.

The floss core can be tubular or flat. If tubular, a plurality of elongated bristle groups can extend parallel to one another in the longitudinal direction in a spaced-apart relationship with each other around a circumference of the floss core defining longitudinal gaps therebetween. If flat, a plurality of elongated bristle groups can extend parallel to one another in the longitudinal direction on two opposed, elongated flat surfaces of the tape defining longitudinal gaps therebetween.

In another implementation of the invention, a bristled dental floss for removing plaque, tartar, food particles and the like from between a user's teeth includes an elongated, flexible floss core extending along a longitudinal direction, and a plurality of bristle groups, each bristle group formed by a respective plurality of floss bristles. The bristle groups extend in the longitudinal direction in a parallel, spaced-apart relationship with one another defining longitudinal gaps therebetween. An undulating pattern is formed in the longitudinal direction on the outer side of each bristle group. The undulating patterns include longitudinally-spaced apart undulating pattern ridges for reaching and removing accumulated material housed in recessed areas in between teeth.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a bristled dental floss having multiple floss bristles arranged in one or more bristle groups which effectively remove food particles from between a user's teeth.

Figure 6:
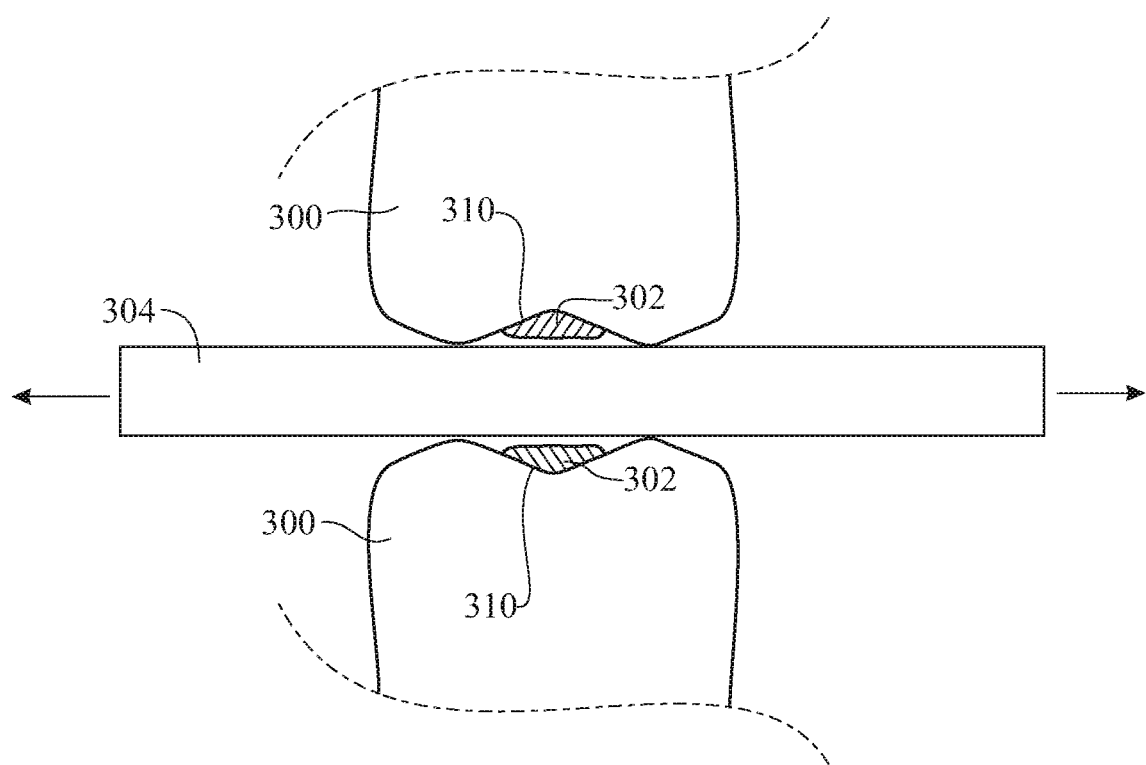
FIG. 6 presents a top view of a prior art tape floss being used to clean between a pair of molars.
Figure 7:
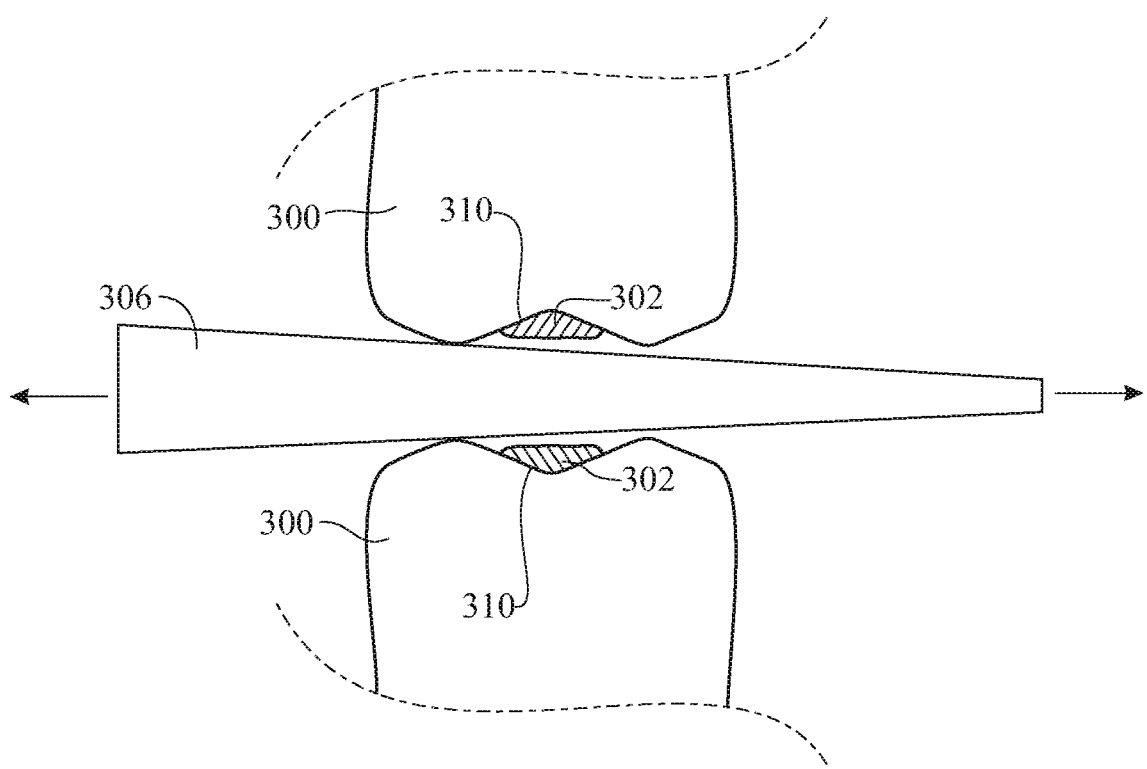
FIG. 7 presents a top view of a prior art dental pick being used to clean between a pair of molars.
Figure 8:
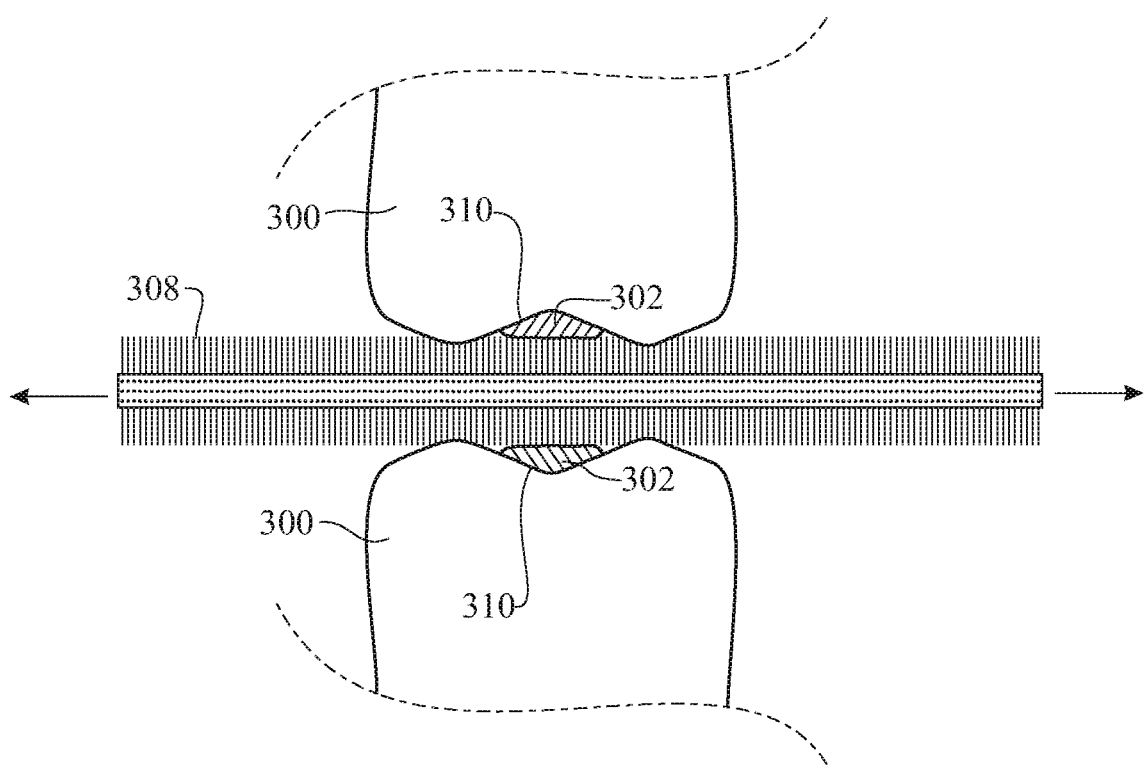
FIG. 8 is a top view of a prior art interproximal brush being used to clean between a pair of molars.

Referring initially to FIGS. 6-8, typical conventional techniques for removing material 302 such as plaque, tartar, food particles and the like from between a user's teeth 300, are illustrated. These exemplary techniques include but are not limited to conventional dental floss 304 (FIG. 6), a conventional dental pick 306 (FIG. 7) and a conventional bristled interproximal brush 308 (FIG. 8). One of the limitations of these and other conventional techniques is that they may be unable to reach small particles of the material 302, particularly in concave areas, recessed areas or similar hard-to-reach areas alongside and between the teeth 300. Thus, when the user moves the dental floss 304, dental pick 306 or interproximal brush 308 back and forth, the hard-to-reach material 302 remains unaffected by the back and forth passing of the dental floss 304, dental pick 306 or interproximal brush 308 and is not removed from in between the teeth 300. As days go by, the material 302 hardens and becomes increasingly harder to remove by the conventional dental floss 304, dental pick 306 or interproximal brush 308. Finally, plaque or tartar buildup, bacteria buildup, a tooth cavity and/or gum disease may occur in the area of the material 302 as a consequence of the material 302 not having been removed.

Figure 1:
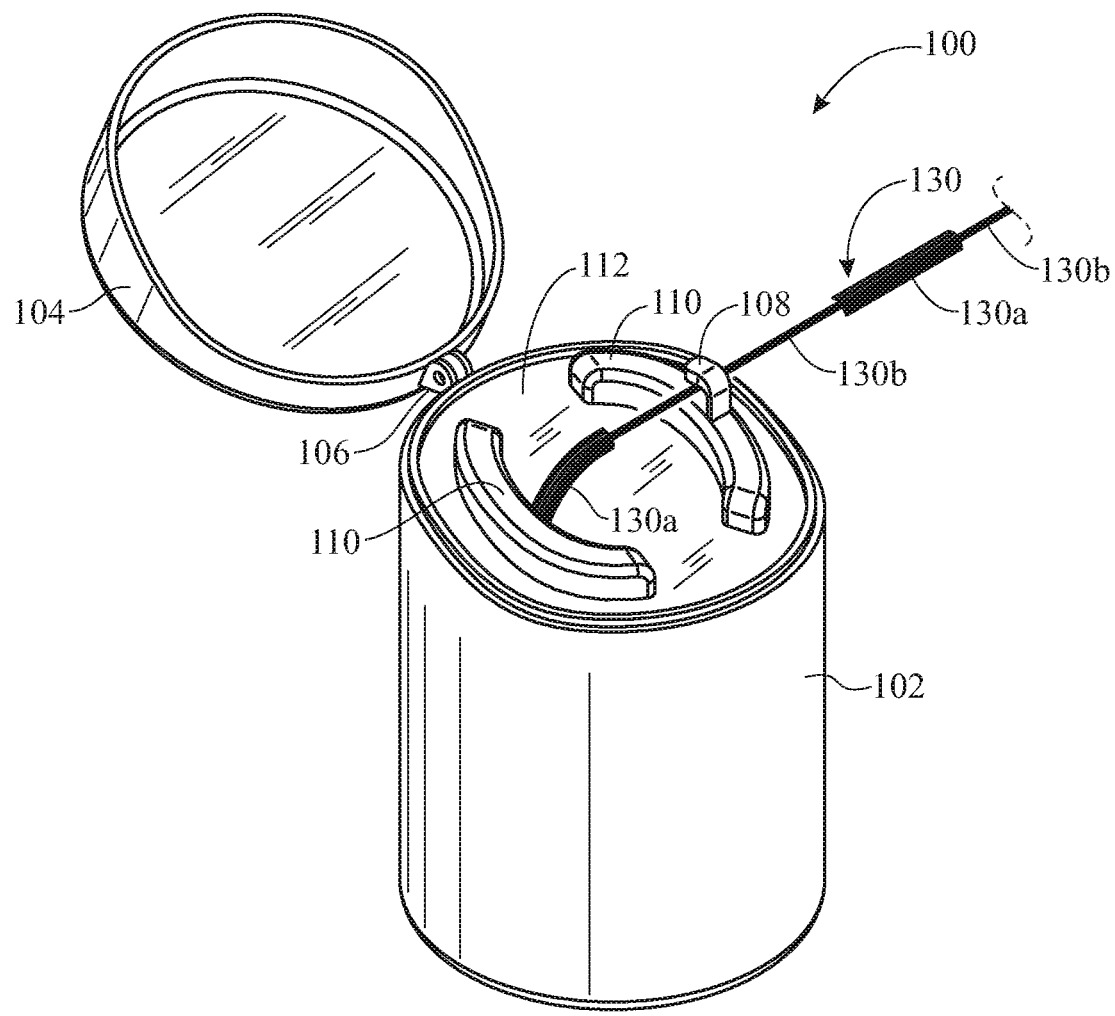
FIG. 1 presents a perspective view of a floss dispensing container and a floss strand extending from the floss dispensing container in an exemplary embodiment of the bristled dental floss of the present invention.
Figure 2:
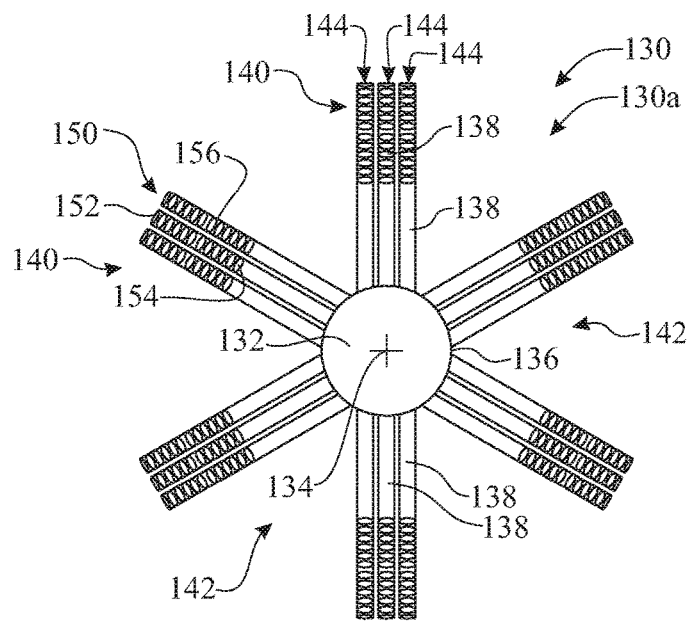
FIG. 2 presents a front elevation view of the floss strand of the bristled dental floss of FIG. 1.
Figure 3:
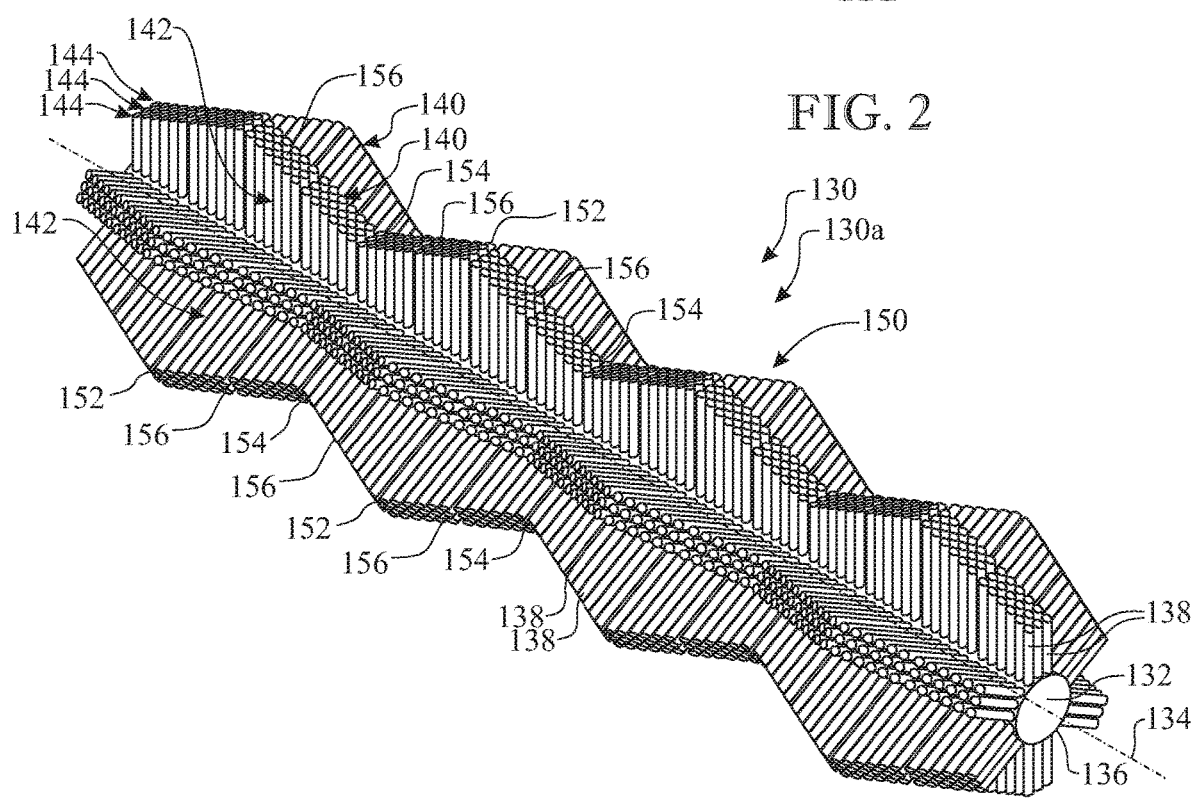
FIG. 3 presents a perspective view of the floss strand illustrated in FIG. 2.

Referring now to FIGS. 1-3, a bristled dental floss 100 is illustrated in accordance with an exemplary embodiment of the present invention. As illustrated in FIG. 1, in some embodiments, the bristled dental floss 100 may include a floss strand 130 which is dispensed from a floss dispensing container 102 typically in the conventional manner. A container lid 104 may be pivotally attached to the floss dispensing container 102 at a hinge 106. The floss strand 130 may be wound on a spool (not illustrated) inside the floss dispensing container 102, and may extend through an opening (not illustrated) in the top of the floss dispensing container 102. A floss cutting blade 108 may be provided on the dispensing container 102; for instance and without limitation, the floss cutting blade 108 can be arranged on a container flange 110 which in turn protrudes from a top surface 112 of the floss dispensing container 102. In typical operation of the bristled dental floss 100 of the present embodiment, segments of the floss strand 130 having a selected length may be pulled from the spool inside the floss dispensing container 102 and severed on the floss cutting blade 108 for use, as will be described in greater detail hereinafter.

As illustrated in FIGS. 2 and 3, the floss strand 130 can include an elongated, flexible floss core 132, formed as a cord or thread along a longitudinal axis 134, and providing a spinal structure to the floss strand 130 but allowing the floss strand 130 to flex. As shown in FIG. 2, the floss core 132 may have a circular cross-section, the section taken along a transverse section plane which is perpendicular to the longitudinal axis 134, or alternative cross-sections such as an elliptical cross-section or an oval cross-section, for instance and without limitation. In some embodiments, the floss core 132 may be solid in cross-section. In other embodiments, the floss core 132 may be tubular. The floss core 132 has an outer floss core surface 136. In the present embodiment, the floss core surface 136 is cylindrical.

Multiple columnar floss bristles 138 extend outwardly from the floss core surface 136 of the floss core 132. The floss bristles 138 may be arranged in at least one elongated bristle group 140 which extends along and in generally parallel relationship to the longitudinal axis 134 of the floss core 132. As illustrated in FIG. 2, in some embodiments, multiple bristle groups 140 may extend from the floss core surface 136 of the floss core 132 in an angularly spaced-apart relationship to each other around the circumference of the floss core surface 136, i.e. around the longitudinal axis 134 of the floss core 132. An elongated gap 142 is formed between each pair of adjacent bristle groups 140, the elongated gaps 142 extending along and in generally parallel relationship to the longitudinal axis 134 of the floss core 132. In the non-limiting example illustrated in FIGS. 2 and 3, six bristle groups 140 extend from the floss cure surface 136 in equally-spaced relationship to each other around the circumference of the floss core 132, and six corresponding gaps 142 extend between corresponding pairs of adjacent bristle groups 140.

As further illustrated in FIG. 2, the bristles 138 of each bristle group 140 can be arranged in bristle rows 144 disposed adjacent to each other across the width of each bristle group 140. For instance, in the non-limiting example illustrated in FIG. 2, three bristle rows 144 are disposed across the width of each bristle group 140. In alternative embodiments, as few as one or more than three bristle rows 144 may be disposed across the width of each bristle group 140.

As best shown in FIG. 3, an outer side or surface of each respective bristle group 140 may be formed with an undulating pattern 150 along the length of each bristle group 140. Accordingly, the lengths of the floss bristles 138 may be selected and arranged or placed such that the floss bristles 138 form the undulating pattern 150 in each bristle group 140. In the illustrated embodiment, the undulating pattern 150 is comprised of interspersed, angular peaks or ridges 152 and angular valleys or troughs 154, and intermediate, undulating pattern sloped sections 156 extending from each pair of adjacent ridges 152 and troughs 154. In some embodiments, the undulating pattern sloped sections 156 may be straight and form approximately 45 degrees with the longitudinal axis 134. In other words, each bristle group 140 may include multiple angular, V-shaped notches formed by undulating pattern ridges 152 and a undulating pattern trough 154 between the adjacent undulating pattern ridges 152, and a pair of undulating pattern sloped sections 156 may slope or angle from each undulating pattern ridge 152 to the respective adjacent undulating pattern troughs 154. As shown, the bristled dental floss 100 of the present embodiment is such that the undulating patterns 150 of the respective bristle groups 140 are not offset to one another along the longitudinal axis 134. In other words, the undulating pattern ridges 152 of each bristle group 140 are in circumferential registration with undulating pattern ridges 152 of the remaining bristle groups 140 and, similarly, the undulating pattern troughs 154 of each bristle group 140 are in circumferential registration with undulating pattern troughs 154 of the remaining bristle groups 140.

Figure 9:
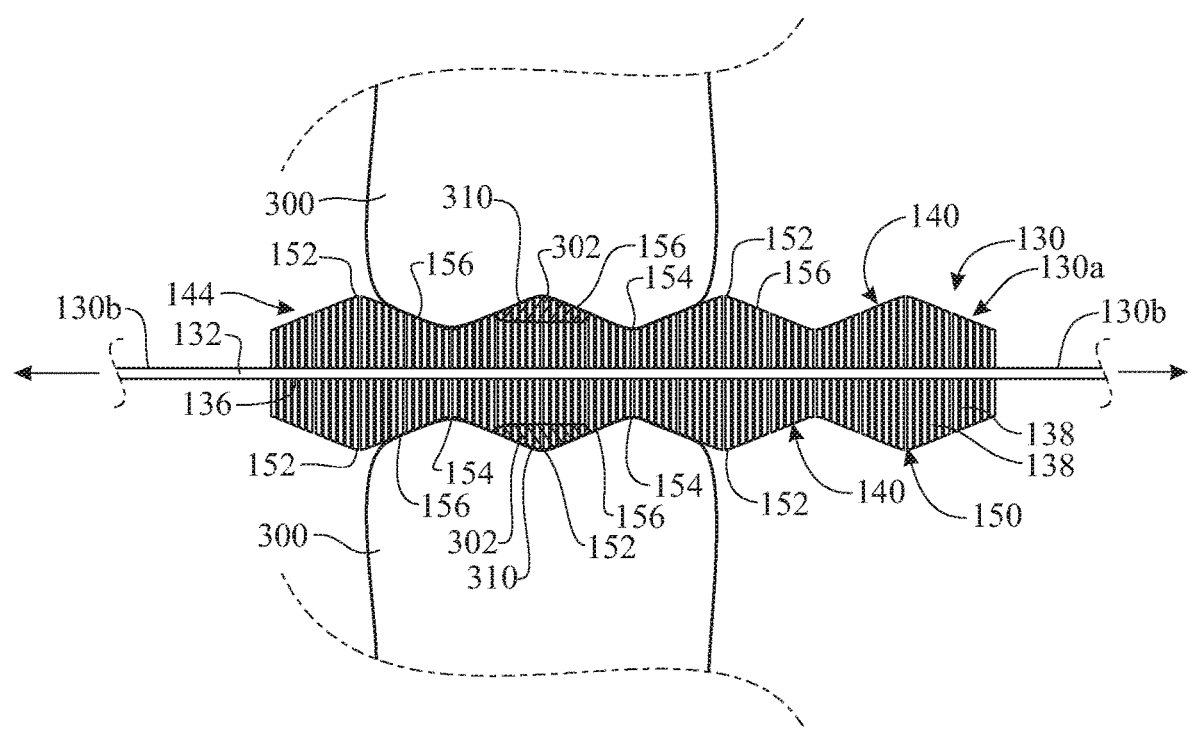
FIG. 9 is a top view of the bristled dental floss illustrated in FIGS. 1-3 being used to clean between a pair of molars in typical application of the bristled dental floss according to the present invention.

As shown in FIG. 1, the bristle groups 140 may extend along the floss strand 130 in a discontinuous manner, the floss strand 130 thus including alternating bristled sections 130*a* and non-bristled sections 130*b*. For instance and without limitation, 4-inch long bristled sections 130*a* may be longitudinally interspersed with 12-inch non-bristled sections 130*b*. Having alternating bristled and non-bristled sections 130*a* and 130*b* allows the user to severe, by means of the floss cutting blade 108, a floss strand operating portion consisting of two non-bristled end portions and a central bristled portion; for instance and without limitation, the floss strand operating portion may consist of two approximately 6-inch long, non-bristled end portions (each corresponding to half a bristled section 130*b*) and a central 4-inch bristled portion (corresponding to a bristle section 130*a*). The user can securely hold and manipulate the non-bristled end portions to move the central bristled portion or section 130*a* back and forth between the teeth, as depicted in FIG. 9. Alternative embodiments are contemplated, however, in which the bristle groups 140 may extend uninterruptedly along the floss strand 130.

The floss strand 130, and particularly the floss bristles 138, may be fabricated, for instance and without limitation, of nylon or another synthetic material; woven nontoxic plant or tree fibers that are soft, gentle and flexible; a thermoplastic material, a thermoelastic material, rubber and/or another petroleum-based material known by those skilled in the art; or any combination thereof.

The floss strand 130 can be fabricated, for instance and without limitation, by molding the floss bristles 138 on the floss core 132. The undulating pattern 150 including the undulating pattern ridges 152, the undulating pattern troughs 154 and the undulating pattern sloped sections 156 can be cut or trimmed in the molded bristle groups 140. For example and without limitation, the undulating pattern 150 may be cut to the desired height, width, length and shape in the bristle groups 140 via a trimming machine which is suitable for the purpose. The particular size, measurement, construction and design specifications may vary depending on the particular manufacturing considerations.

Referring next to FIGS. 1 and 9, in typical application of the bristled dental floss 100, the container lid 104 is opened on the floss dispensing container 102, as illustrated in FIG. 1. A selected length of the floss strand 130 is pulled from the floss dispensing container 102 and severed on the floss cutting blade 108. As illustrated in FIG. 9, the severed segment of the floss strand 130 is inserted between a pair of adjacent teeth 300 or between gum lines or in other crevices in the mouth of the user and then repeatedly moved in, for instance, a back-and-forth motion. Accordingly, the floss bristles 138 contact and dislodge material 302 such as plaque, tartar, food particles and the like from between the user's teeth 300. The undulating pattern 150 of the bristle groups 140 is effective in reaching and removing material 302 located in recessed areas or concavities on a tooth, gum or other area (for instance, recessed area 310 shown in FIG. 9), as the outwardly protruding undulating pattern ridges 152 are capable of reaching farther into the recessed areas. In addition, the gaps 142 between the bristle groups 140 can retain material 302 removed by the bristle groups 140 and prevent the material from falling off the bristle groups 140 and remaining between the teeth 300 when the user removes the floss strand 130. Further, having the undulating pattern 150 provided by adequately cut, flexible individual bristles 138 contributes to improve the cleaning of the remote areas or recessed areas 310, as the flexible individual bristles 138 cut to different lengths (to achieve the undulating pattern 150) can individually deform and rub against different small protrusions or recessions in the surface of the teeth 300, the floss strand 130 thus better conforming to irregular surfaces of the teeth 300.

Therefore, it will be appreciated by those skilled in the art that the floss strand 130 of the bristled dental floss 100 is capable of removing material 302 such as plaque, food particles, tartar and the like from teeth 300 which conventional dental floss 304 (FIG. 6) typically misses. The undulating pattern 150 on the bristle groups 140 ensures that the teeth 300 are fully-cleaned and maintained at all times throughout the day. The floss strand 130 successfully eliminates plaque, food particles, tartar buildup and bacteria from between teeth 300, reducing the chance of cavities and other tooth decay from occurring and extending the longevity of the teeth 300. These advantages may be achieved without requiring hard and rigid materials to fabricate the floss strand 130. Accordingly, fabrication of the floss strand 130 may utilize soft and flexible materials in order to prevent the user's gums from bleeding excessively during flossing while successfully thoroughly cleaning gaps between the teeth 300.

Figure 4:
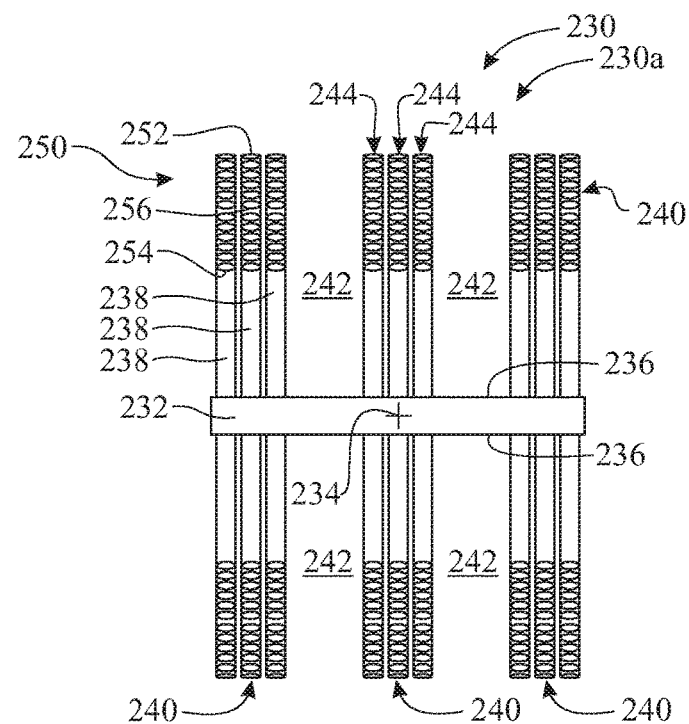
FIG. 4 presents a front elevation view of an alternative configuration for the floss strand in accordance with the present invention.
Figure 5:
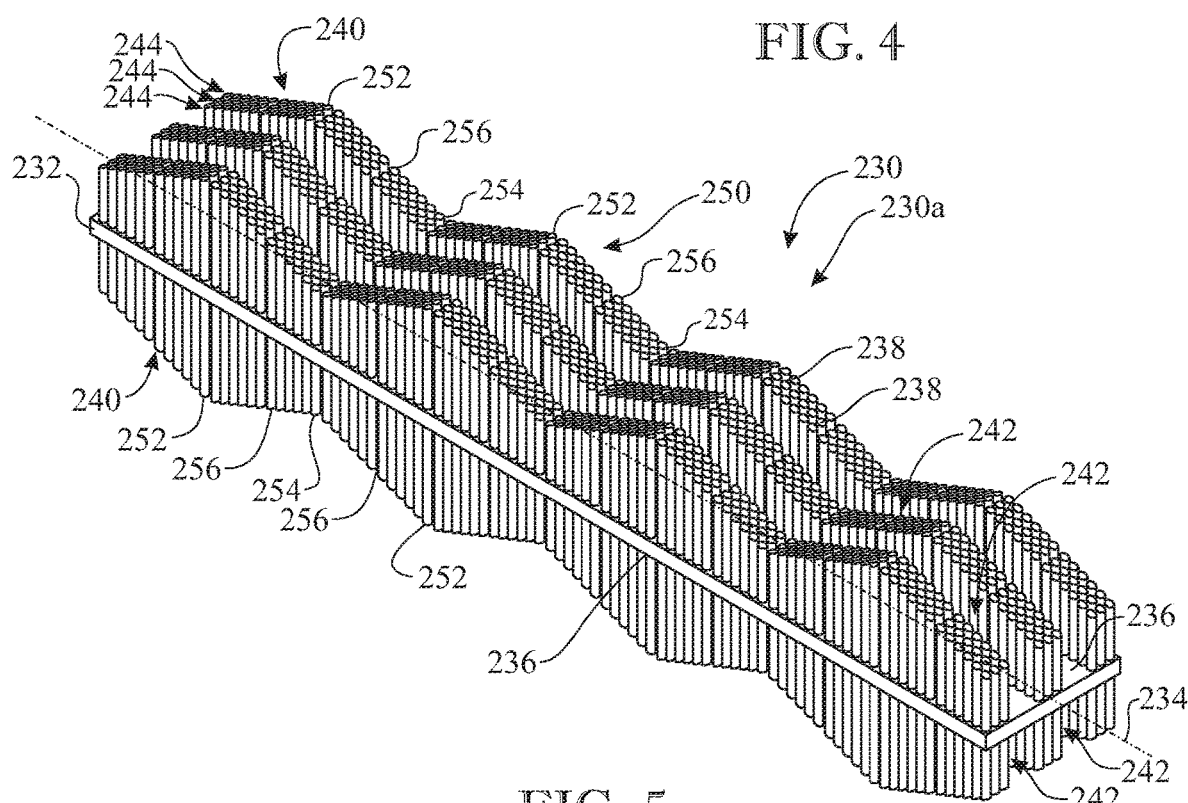
FIG. 5 presents a perspective view of the floss strand illustrated in FIG. 4.

Referring next to FIGS. 4 and 5, a floss strand 230 according to an alternative illustrative embodiment of the bristled dental floss is illustrated. In FIGS. 4 and 5, like features of the floss strand 230 and the floss strand 130 (FIGS. 1 through 3) are numbered the same except preceded by the numeral '2'. As shown, the floss core 232 of the floss strand 230 of the present embodiment is generally rectangular in cross-section, with a flat, tape-shaped configuration. Accordingly, the floss core 232 has a pair of opposite, flat or planar floss core surfaces 236. At least one bristle group 240 extends from each core surface 236 in parallel relationship to the longitudinal axis 234 thereof, either interruptedly along the floss strand 230 in order for non-bristled sections to be defined, similarly to the previous embodiment, or uninterruptedly along the length of the floss strand 230. In some embodiments, multiple bristle groups 240 may in fact extend from each floss core surface 236 in generally spaced-apart, parallel, adjacent relationship to each other; for instance, the present embodiment includes three spaced-apart, substantially parallel bristle groups 240 extending longitudinally from each floss core surface 236. The undulating pattern 250 in each bristle group 240 may have the same shape as the undulating pattern 150 in each bristle group 140 of the floss strand 130 as was heretofore described. Typical use of the floss strand 230 may be as was heretofore described with respect to the floss strand 130 of the bristled dental floss 100 in FIG. 9.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A bristled dental floss for removing plaque, tartar, food particles and the like from between a user's teeth, comprising:
    an elongated, flexible floss core extending along a longitudinal direction, the floss core having a rectangular cross section and a first surface and a second surface opposite the first surface, the floss core provided with a plurality of bristled sections each bristled section of the plurality of bristled sections having three spaced apart groupings of bristles extending from the top and bottom surfaces of the core, each of the groupings including a plurality of parallel rows of cylindrical bristles with a spacing between neighboring rows within the groupings being less than a spacing between the groupings and each bristled section forming a first length, the bristled sections of the plurality of bristled sections alternating along the longitudinal direction with non-bristled sections; and
    an undulating pattern formed in the longitudinal direction on each bristled section by distal free ends of the bristles of each bristled section.

2. The bristled dental floss of claim 1, wherein the undulating pattern comprises a plurality of undulating pattern ridges, an undulating pattern trough between each pair of adjacent undulating pattern ridges, and a pair of undulating pattern sloped sections extending between each undulating pattern ridge of the plurality of undulating pattern ridges and an adjacent pair of undulating pattern troughs of the plurality of undulating pattern troughs.

3. The bristled dental floss of claim 2, wherein the undulating pattern ridges are V-shaped.

4. The bristled dental floss of claim 2, wherein the undulating pattern troughs are V-shaped.

5. The bristled dental floss of claim 1, wherein the floss core is generally formed as a cord.

6. The bristled dental floss of claim 1, wherein the floss core is generally formed as a tape.

7. The bristled dental floss of claim 1, wherein the floss core is generally elongated with a flat, tape-shaped configuration.

8. The bristled dental floss of claim 1, wherein each non-bristled section having a length longer than the first length.

9. The bristled dental floss of claim 1, wherein the bristled dental floss comprises: nylon, woven non-toxic plant or tree fibers, thermoplastic, thermoelastic, rubber, or a combination thereof.

10. A bristled dental floss for removing plaque, tartar, food particles and the like from between a user's teeth, comprising:
    an elongated, flexible floss core extending along a longitudinal direction, the floss core having a rectangular cross section and a first surface and a second surface opposite the first surface, the floss core provided with a plurality of bristled sections, each bristled section having three spaced apart groupings of bristles extending from the top and bottom surfaces of the core, each of the groupings including a plurality of parallel rows of cylindrical bristles with a spacing between neighboring rows within the groupings being less than a spacing between the groupings and each bristled section having a first length, each bristled section alternating along the longitudinal direction with a non-bristled section, each non-bristled section having a length greater than the first length; and
    an undulating pattern formed in the longitudinal direction on each bristled section by distal free ends of the bristles of each bristled section, the undulating pattern including a plurality of longitudinally-spaced apart undulating pattern ridges.

11. The bristled dental floss of claim 10, wherein the undulating pattern ridges are V-shaped.

12. The bristled dental floss of claim 10, wherein the floss core is generally elongated with a flat, tape-shaped configuration.

13. The bristled dental floss of claim 10, wherein:
    the undulating pattern formed in the longitudinal direction on each bristled section comprises, a plurality of undulating pattern valleys interspersed with the plurality of undulating pattern ridges, and undulating pattern sloped sections extending between each of the plurality of undulating pattern ridges and an adjacent pair of the plurality of undulating pattern valleys.

14. The bristled dental floss of claim 10, wherein the bristled dental floss comprises: nylon, woven non-toxic plant or tree fibers, thermoplastic, thermoelastic, rubber, or a combination thereof.

15. A bristled dental floss for removing plaque, tartar, food particles, and the like from between a user's teeth, comprising:
    an elongated, flexible floss core extending along a longitudinal direction, the floss core having a rectangular cross section and a first surface and a second surface opposite the first surface, the floss core provided with a plurality of bristled sections, each bristled section of the plurality of bristled sections having three spaced apart groupings of bristles extending only from the top and bottom surfaces of the core, each of the groupings including a plurality of parallel rows of cylindrical bristles with a spacing between neighboring rows within the groupings being less than a spacing between the groupings and an undulating pattern formed in the longitudinal direction on each bristled section by distal free ends of the bristles of each bristled section.

16. The bristled dental floss of claim 15, wherein the undulating pattern comprises a plurality of undulating pattern ridges, an undulating pattern trough between each pair of adjacent undulating pattern ridges, and a pair of undulating pattern sloped sections extending between each undulating pattern ridge of the plurality of undulating pattern ridges and an adjacent pair of undulating pattern troughs of the plurality of undulating pattern troughs.

17. The bristled dental floss of claim 16, wherein the undulating pattern ridges are V-shaped.

18. The bristled dental floss of claim 16, wherein the undulating pattern troughs are V-shaped.

19. The bristled dental floss of claim 15, wherein the floss core is general formed as a tape.

20. The bristled dental floss of claim 15, wherein the bristled dental floss comprises: nylon, woven non-toxic plant or tree fibers, thermoplastic, thermoelastic, rubber, or a combination thereof.

* * * * *